US006971967B2

(12) United States Patent
Whitmarsh

(10) Patent No.: US 6,971,967 B2
(45) Date of Patent: Dec. 6, 2005

(54) CLUTCH-DRIVEN LIMITED FORCE ACTUATOR

(75) Inventor: Sean Whitmarsh, Castaic, CA (US)

(73) Assignee: Ricon Corporation, Panorama City, CA (US)

( * ) Notice: Subject to any disclaimer, the term of this patent is extended or adjusted under 35 U.S.C. 154(b) by 23 days.

(21) Appl. No.: 10/455,936

(22) Filed: Jun. 6, 2003

(65) Prior Publication Data

US 2004/0038767 A1   Feb. 26, 2004

Related U.S. Application Data

(60) Provisional application No. 60/386,338, filed on Jun. 6, 2002.

(51) Int. Cl.[7] .............................................. F16H 48/06
(52) U.S. Cl. ..................................................... 475/149
(58) Field of Search .......................... 292/7, 201, 199; 475/149; 74/52; 254/2 C

(56) References Cited

U.S. PATENT DOCUMENTS

| 4,223,927 A | 9/1980 | Kobayashi et al. ............. 292/1 |
| 4,796,932 A | 1/1989 | Tame .......................... 292/112 |
| 6,536,814 B2 | 3/2003 | Kachouh ..................... 292/216 |

Primary Examiner—Dirk Wright
(74) Attorney, Agent, or Firm—Jeffer, Mangels, Butler & Marmaro LLP

(57) ABSTRACT

A clutch-driven limited force actuator is disclosed having a motor, a planetary gear mechanism in operative communication with the motor and a clutch plate. The clutch plate includes a contact surface selectively in frictional contact with the planetary gear mechanism to drive an actuator arm. In operation, the frictional force between the planetary gear mechanism and the clutch plate causes the actuator arm to actuate. The actuator arm can be connected to any element that requires actuation. The actuator of the present invention is preferably used in a wheelchair lift to actuate any mechanism that must have a safe limit on the amount of force applied to obstacles and that must have provision for direct manual operation.

30 Claims, 4 Drawing Sheets

CLUTCH-DRIVEN LIMITED FORCE ACTUATOR

CROSS-REFERENCE TO RELATED APPLICATIONS

This application claims priority from U.S. Provisional Patent Application No. 60/386,338 filed on Jun. 6, 2002, the contents of which are incorporated herein by reference.

FIELD OF THE INVENTION

The present invention relates generally to friction-force actuators, and particularly to friction-force actuators that can be adapted for use in operating secondary mechanisms of a wheelchair lift where safety is a concern.

BACKGROUND OF THE INVENTION

Wheelchair lifts are provided for facilitating the loading of wheelchairs and wheelchair occupants on and off vehicles. When the lift is used to load a wheelchair onto the vehicle, the lift is positioned at the ground level and is configured to allow the wheelchair and its occupant to roll onto a platform. Once the wheelchair has been loaded onto the platform, a barrier or roll stop is raised at the end of the platform assembly to prevent the wheelchair from rolling off of the platform while the lift is in motion. Barriers may be provided on the front end of the platform, the back end of the platform, as well as both sides of the platform to ensure the safety of the wheelchair occupant. When the wheelchair lift is raised to the vehicle entry level, the vehicle-side barriers drop, allowing the wheelchair to exit the platform onto the vehicle.

Similarly, when the wheelchair is unloaded from the vehicle, the lift is positioned at the entry level of the vehicle, with the vehicle-side barriers down, to allow the wheelchair access to the platform. When the wheelchair is securely positioned on the platform, the barriers are raised to prevent the wheelchair from rolling off of the platform during transport. The platform is then lowered from the entry level position to the ground level position. Upon arrival at the ground level, the barriers opposite the vehicle are released and lowered to allow the wheelchair to exit from the platform onto the ground.

It is desirable to provide a device for automating the raising and release of the platform barriers to avoid the need to manually engage the barriers during each use. Accordingly, it is desirable to provide an actuator that automates the operation of the barriers.

Although automatic operation of the barriers is desirable, from time to time, there may be a need to manually operate the barriers. Typically, the manual operation of automated devices requires the disengagement of the actuator and the movement of the barrier by hand. The disadvantage of these known devices is that manual operation of the barriers often causes the device to become mechanically "lost," i.e., after manual operation, the device is left out of sequence. As a result of being out of sequence, when the device is reactivated, it often gets jammed or otherwise malfunctions.

Accordingly, there is a need for an actuator that automates the operation of the barriers while still allowing manual operation thereof as needed, without requiring disengagement of the actuator from the barrier during manual operation, and without resulting in the mechanical mis-sequencing of the device.

The automation of the barriers raises certain safety issues. Although desirable to automatically move the barriers up and down during each use, there may be some situations in which the motion of the barriers should be limited. For example if someone's foot is positioned underneath the barrier, for safety purposes, the actuator should be limited in the amount of force it applies to the barrier. Accordingly, it is desirable to provide an actuator that limits the amount of force it applies to the barrier upon contact with an intervening obstacle.

SUMMARY OF THE INVENTION

A clutch-driven limited force actuator is disclosed having a motor, a planetary gear mechanism in operative communication with the motor and a clutch plate. The clutch plate includes a contact surface in frictional contact with the planetary gear mechanism and applying a selective amount of force to drive an actuator arm. In operation, the frictional force between the planetary gear mechanism and the clutch plate causes the actuator arm to actuate. The actuator arm can be connected to any element that requires actuation. The actuator of the present invention is preferably used in a wheelchair lift to actuate the barriers of the lift.

In a preferred embodiment of the invention, the planetary gear mechanism includes a plurality of planetary gears orbiting the spindle of the motor and a ring gear engaged with and driven by the planetary gears. The clutch plate is biased toward the ring gear by a wave washer and is selectively in frictional contact with the ring gear. In operation, the clutch plate rotates with the ring gear when the plate is in frictional contact with the ring gear. When the frictional force is overcome, the clutch plate will no longer rotate, even if the motor continues to operate.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

Like numerals refer to like parts throughout the several views of the drawings.

DESCRIPTION OF THE INVENTION

Figure 1:
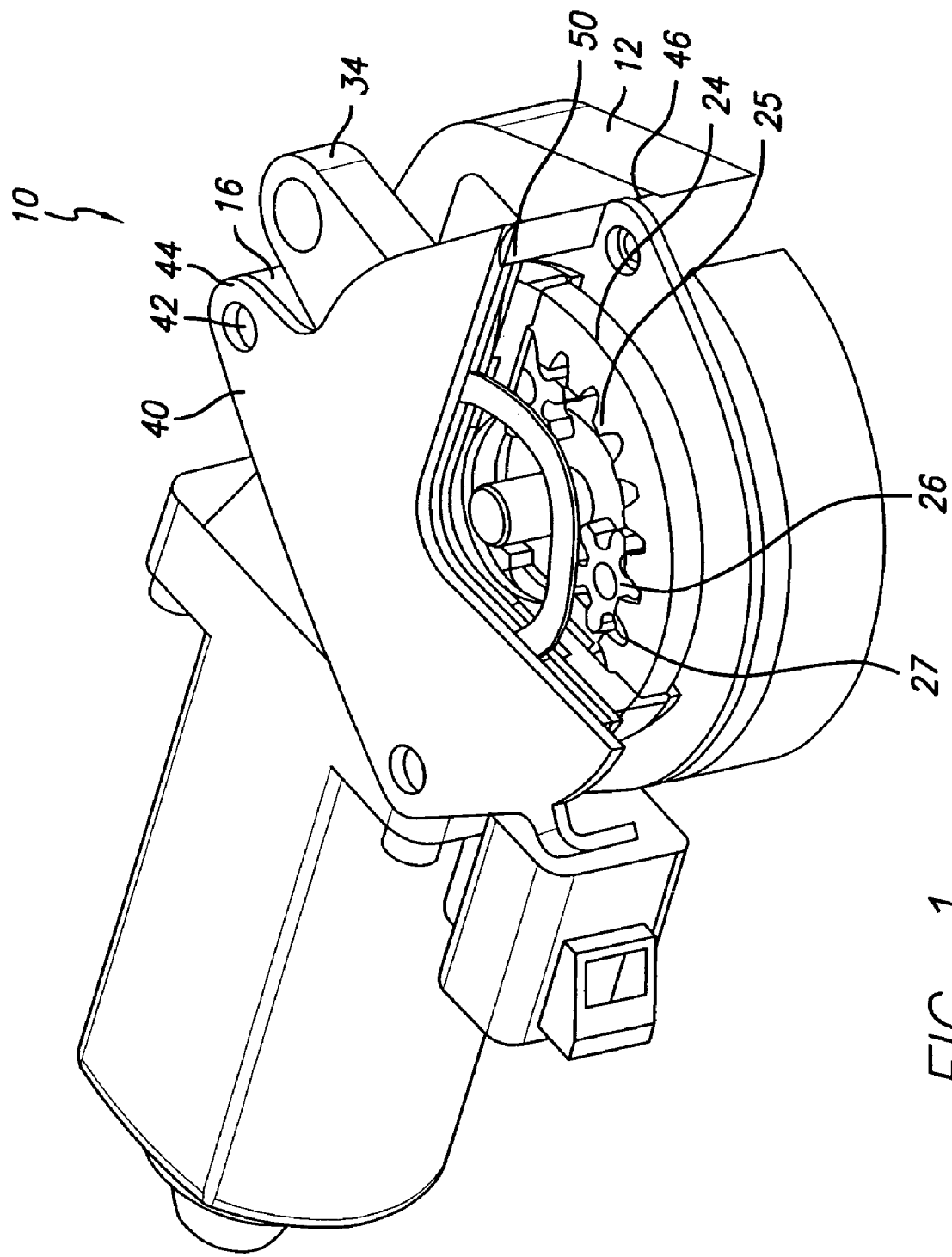
FIG. 1 is a perspective view of a preferred embodiment of the clutch-driven limited force actuator of the present invention.
Figure 2:
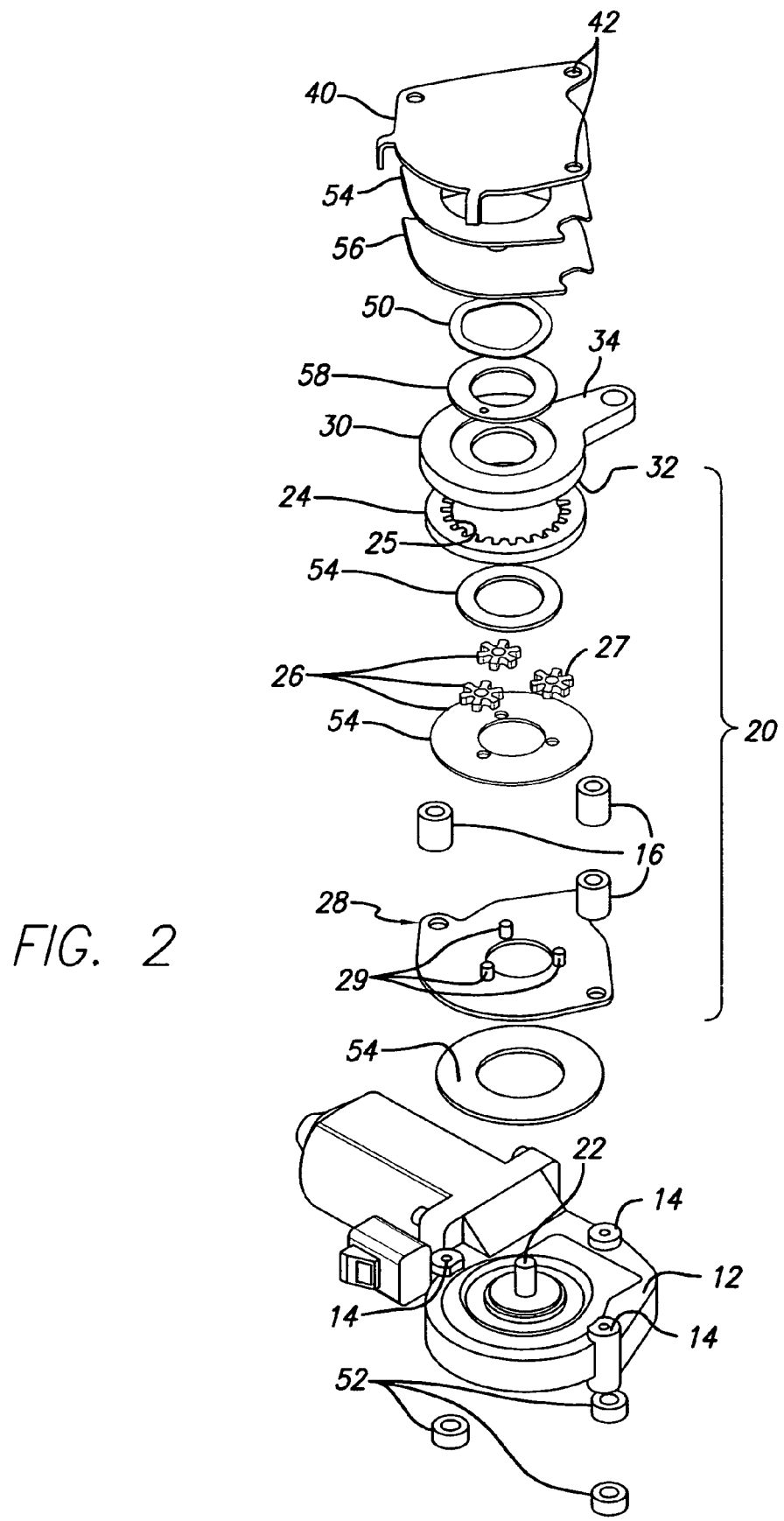
FIG. 2 is an exploded view of a preferred embodiment of the clutch-driven limited force actuator of the present invention.
Figure 3:
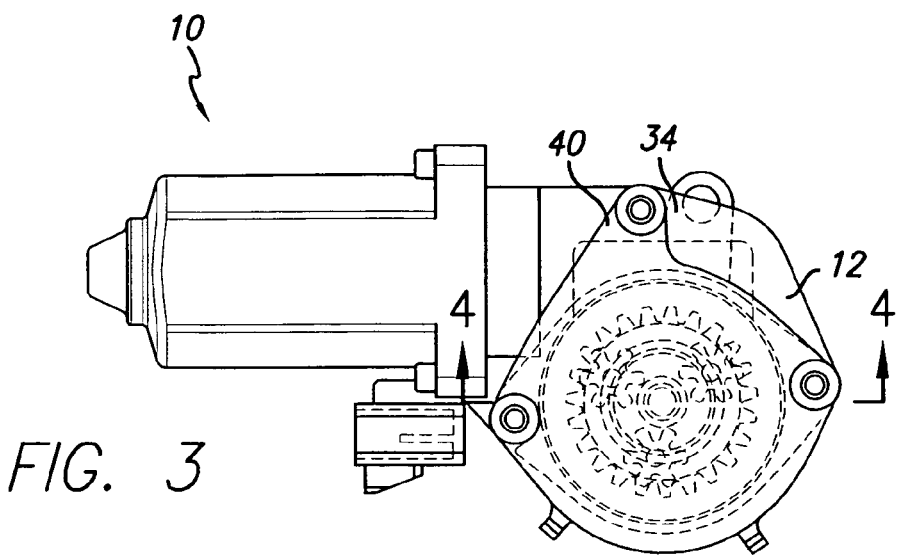
FIG. 3 is a top plan view of a preferred embodiment of the clutch-driven limited force actuator of the present invention.

FIGS. 1 through 4 illustrate a preferred embodiment of the clutch-driven limited force actuator 10 of the present invention. The actuator 10 includes a motor 12, a planetary gear mechanism 20, a pressure plate or clutch plate 30 and an actuation stop plate 40. The motor 12 is preferably a 12 volt direct current motor having a clockwise rotation. It is envisioned that various types of motors can be used in the actuator of the present invention without departing from the spirit or scope of the present invention.

Figure 4:
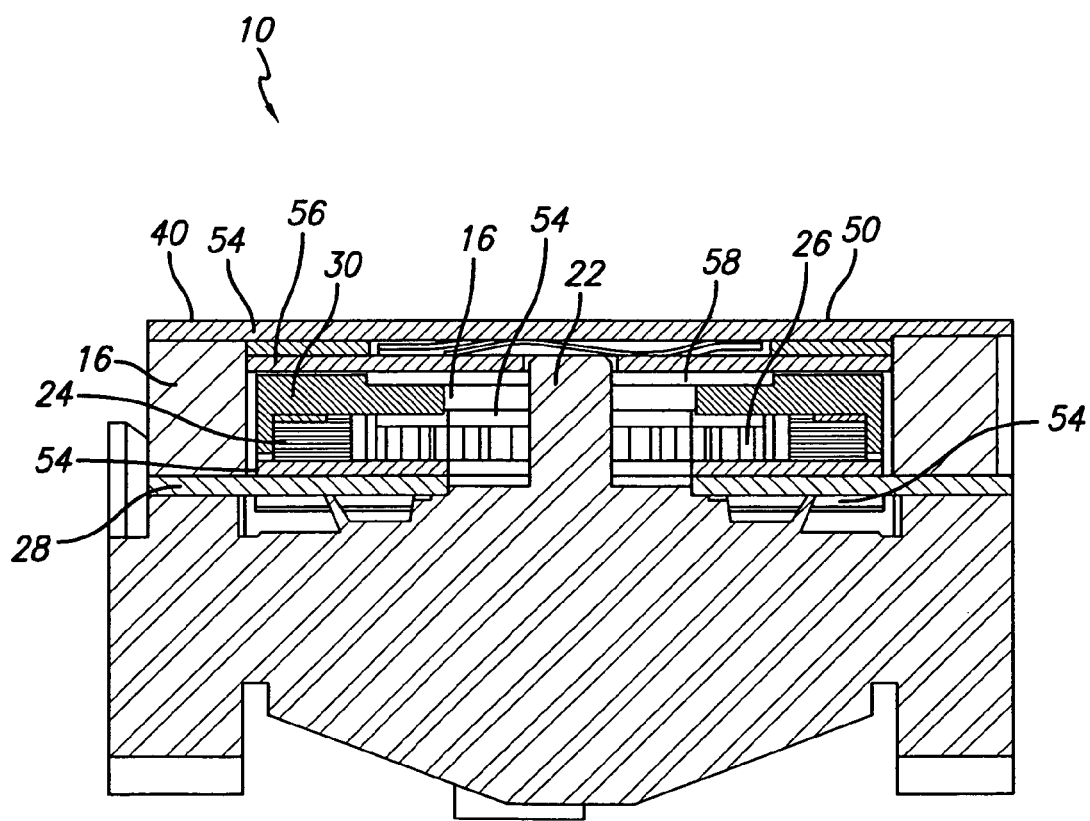
FIG. 4 is a cross-sectional view of the clutch-driven limited force actuator of FIG. 3, taken along line 4—4.

The planetary gear mechanism 20 preferably includes a sun gear 22, ring gear 24 and a plurality of planetary gears 26. As best shown in FIGS. 1 and 4, in a preferred embodiment of the present invention, the sun gear 22 is attached to the spindle of the motor 12. When the motor 12 operates, the sun gear 22 spins. The planetary gears 26 surround the sun gear 22 and have teeth 27 to facilitate the rotation of the planetary gears 26 with respect to the sun gear 22. The sun gear 22 includes teeth corresponding to the teeth 27 on the planetary gears 26 to facilitate the rotation of the planetary gears 26 about the sun gear 22.

To preserve the positioning of the planetary gears with respect to each other, in a preferred embodiment of the invention, the planetary gear mechanism 20 includes a planetary gear carrier plate 28. The planetary gear carrier plate 28 preferably includes a plurality of carrier posts 29, each post corresponding to a planetary gear 28. Each planetary gear 28 is mounted on a carrier post 29 and rotates thereon. The carrier post 29 provides the pivot axis for the rotation of the planetary gear 28.

When the sun gear 22 rotates, it causes the rotation of the planetary gears 26 with respect to the sun gear 22. Because the teeth 27 of the planetary gears 26 are engaged with the teeth 25 of the ring gear 24, the rotation of the planetary gears 26 drives the ring gear 24.

The number of planetary gears 26, and the number of teeth on each of the planetary gears 26, ring gear 24 and sun gear 22 can be varied without departing from the inventive concept of the present invention. In a preferred embodiment of the invention, the planetary gear mechanism 20 includes three planetary gears 26, each having six teeth 27 thereon, a ring gear 24 with twenty-one teeth 25, and a sun gear 22.

The planetary gear mechanism 20, and more preferably the ring gear 24, is in frictional contact with the clutch plate 30. The frictional force between the planetary gear mechanism 20 and the clutch plate 30 is controlled by a biasing device 50. In a preferred embodiment of the invention, the biasing device 50 is a wave washer. The wave washer 50 is positioned such that it exerts force on the clutch plate 30, causing the clutch plate 30 into frictional contact with the planetary gear mechanism 20. The underside 32 of the clutch plate 30 preferably contacts the ring gear 24. When the ring gear 24 rotates, the frictional force on the clutch plate 30 causes the clutch plate to rotate together with the ring gear 24. As a result, the actuator arm 34 also rotates.

In a preferred embodiment of the invention, the clutch plate 30 and ring gear 24 are made of different materials to prevent galling. The clutch plate 30 is preferably made of a bearing material such as brass or bronze. The ring gear 24 is preferably made of steel. Given the force applied by the wave washer 50 and the contact surface area between the clutch plate 30 and ring gear 24, both of which are designed properties of the assembly, those skilled in the art will be able to calculate the friction force between the clutch plate 30 and the ring gear 24. The friction force directly equates to the amount of force the actuator arm 34 can exert. As long as the clutch plate 30 is in frictional contact with the ring gear 24, the actuator 10 applies a constant force on the actuator arm 34. If additional force is required, the strength and the compression of the biasing device or wave washer 50 can be increased, causing it to apply additional biasing force on the clutch plate 30.

To limit the rotation of the clutch plate 30, the actuator 10 of the present invention preferably includes an actuation stop plate 40. In a preferred embodiment of the invention, the actuation stop plate 40 includes a plurality of apertures 42 that correspond to apertures 14 on the motor 12. Spacers 16 are placed between the stop plate 40 and the motor 12 to attach the actuation stop plate 40 spaced apart from the motor 12. Upon alignment of the spacers 16 and the apertures 14, 42, the actuation stop plate 40 is fastened to the motor 12.

When attached to the motor 12, the actuation stop plate 40 provides a first limiting member 44 and a second limiting member 46. The rotation of the actuator arm 34 is limited by the first and second limiting members 44, 46. The distance between the first and second limiting members 44, 46 represents the range of motion of the device actuated by the actuator arm 34.

The actuator 10 of the present invention is never thrown out of sequence. There are no surfaces that separate and re-engage each other. Upon operating the motor 12, the actuator arm 34 will travel until it reaches a limiting member 44, 46. If the motor 12 continues to run after the actuator arm 34 has reached a limiting member, the force of the limiting member on the actuator arm 34 overcomes the friction force between the clutch plate 30 and the planetary gear mechanism 20 and the clutch plate 30 will no longer rotate with the ring gear 24. Accordingly, the actuator will not jam or otherwise become mechanically "lost."

spacers 52, spacer plates 54, wear plates 56 and washers 58 can be used as known by those in the art to ensure smooth operation of the various components of the actuator.

Figure 5:
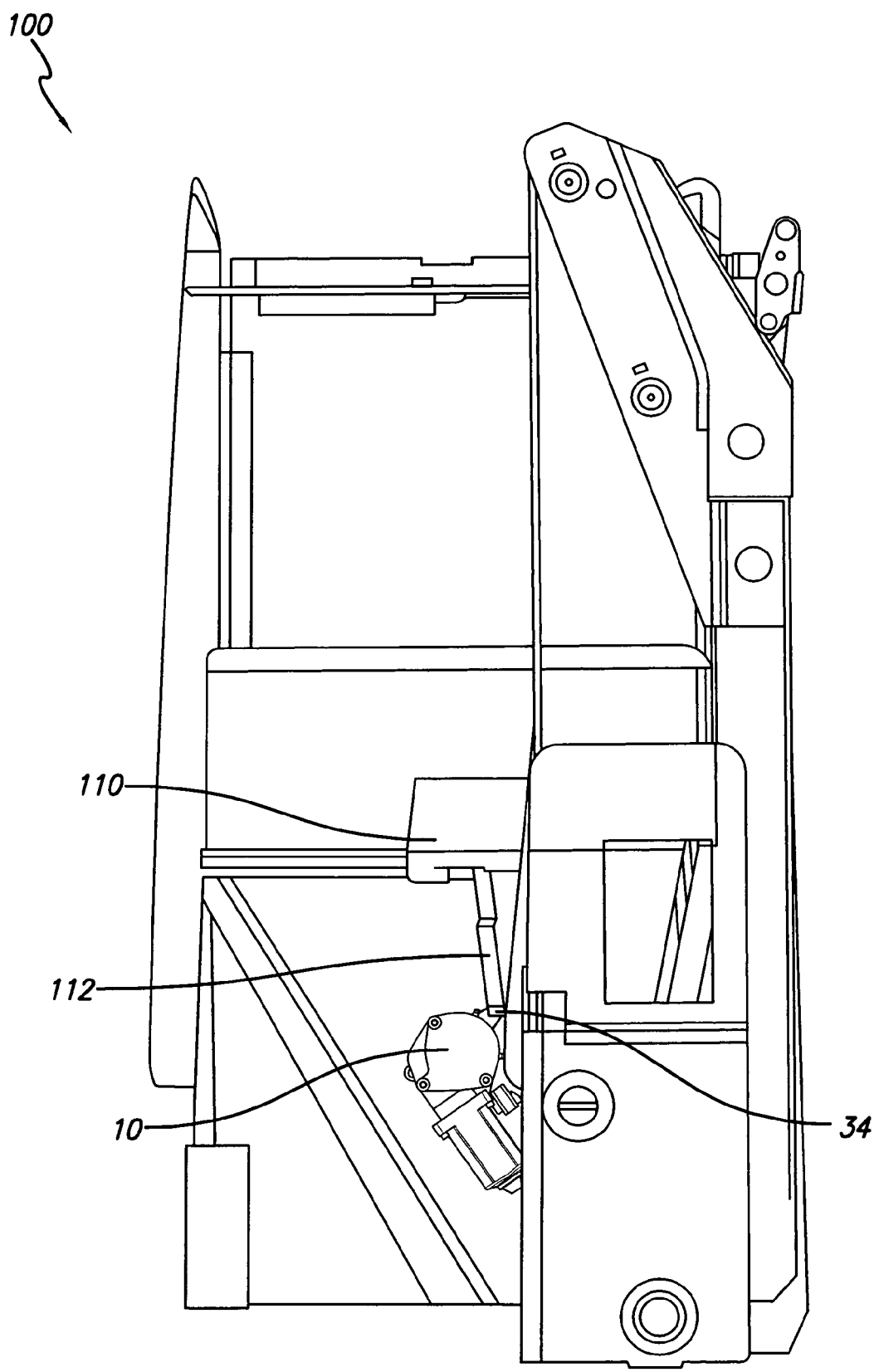
FIG. 5 depicts a preferred embodiment of the clutch-driven limited force actuator of the present invention as installed on a wheelchair lift.

It is envisioned that the clutch-driven limited force actuator 10 can be used in a variety of applications. In a preferred embodiment of the invention, as best shown in FIG. 5, the actuator 10 is used in a wheelchair lift 100 to facilitate the movement of the barriers 110. Actuator arm 34 is operatively connected to a barrier 110 by an extension arm 112. When actuated, the actuator arm 34 actuates the barrier 110 via the extension arm 112. The frictional force between the clutch plate 30 and the planetary gear mechanism 20 is adjusted to be sufficient to overcome the force of the barriers 110 and to move the barriers to the position desired.

If during deployment of the barriers 110, an obstacle is encountered, or in the event that the barriers must be manually operated, the actuator will limit the application of force with minimal interruption and effect on the operation of the actuator. For example, if an obstacle is placed in the path of the barriers, the force of the obstacle will cause the clutch to slip. While the motor is operating, the ring gear 24 will continue to turn, sliding on the clutch plate 30 and thereby applying force to the actuator arm 34. However, the force applied by the actuator arm 34 is limited. Upon removal of the obstacle, the actuator arm 34 continues rotating and applying force on the barriers. The actuator is never taken out of sequence and it is not necessary to disengage the actuator from the barrier to manually operate the barrier.

The embodiments described above are exemplary embodiments of a clutch-driven limited force actuator of the present invention. Those skilled in the art may now make numerous uses of, and departures from, the above-described embodiments without departing from the inventive concepts disclosed herein. Accordingly, the present invention is to be defined solely by the scope of the following claims.

What is claimed is:

1. An actuator comprising:
   a motor;
   a planetary gear mechanism in operative communication with the motor;

a clutch plate, connected to an actuator arm and having a contact surface in frictional contact with the planetary gear mechanism, wherein the actuator arm has a range of travel;

at least one limiting member adapted to abuttingly engage the actuator arm to limit the range of travel of the actuator arm.

2. The actuator of claim 1, wherein when the contact surface of the clutch plate is in frictional contact with the planetary gear mechanism, force is exerted on the actuator arm.

3. The actuator of claim 1 wherein the contact surface of the clutch plate is biased toward the planetary gear mechanism.

4. The actuator of claim 1 wherein the planetary gear mechanism comprises a ring gear and the contact surface of the clutch plate is biased toward the ring gear of the planetary gear mechanism.

5. The actuator of claim 1 further comprising a wave washer configured to bias the clutch plate toward the planetary gear mechanism.

6. The actuator of claim 1 wherein the motor comprises a spindle and the planetary gear mechanism comprises a plurality of planetary gears rotating about the spindle.

7. The actuator of claim 1 wherein the planetary gear mechanism comprises a plurality of planetary gears and a ring gear, wherein the planetary gears drive the ring gear.

8. The actuator of claim 6 wherein the plurality of planetary gears comprise three planetary gears.

9. The actuator of claim 1 wherein the contact surface of the clutch plate comprises brass.

10. The actuator of claim 1 wherein the contact surface of the clutch plate comprises bronze.

11. The actuator of claim 1 wherein the planetary gear mechanism comprises steel.

12. The actuator of claim 1, further comprising a stop plate, wherein the at least one limiting member is connected to the stop plate.

13. The actuator of claim 1, wherein the at least one limiting member is two limiting members.

14. An actuator comprising:
a motor having a spindle;
a planetary gear mechanism having a plurality of planetary gear rotating about the spindle of the motor, and a ring gear engaged with the plurality of the planetary gears;
a clutch plate, having an actuator arm and a contact surface selectively biased toward and in frictional contact with the ring gear of the planetary gear mechanism; and
a wave washer configured to bias the clutch plate toward the ring gear;
wherein when the clutch plate is in frictional contact with the ring gear, force is exerted on the actuator arm.

15. A wheelchair lift, comprising:
a platform assembly having a barrier; and
an actuator configured to automatically actuate the barrier wherein the actuator comprises a motor, a planetary gear mechanism in operative communication with the motor, and
a clutch plate, having a contact surface in frictional contact with the planetary gear mechanism.

16. The wheelchair lift of claim 15 wherein the motor comprises a sun gear and the planetary gear mechanism comprises a plurality of planetary gears rotating with respect to the sun gear.

17. The wheelchair lift of claim 16 wherein the planetary gear mechanism comprises a ring gear and the plurality of planetary gears drive the ring gear, and wherein the clutch plate is selectively in frictional contact with the ring gear of the planetary gear mechanism.

18. The wheelchair lift of claim 15 wherein the clutch plate comprises an actuator arm and the actuator arm is connected to the barrier.

19. The wheelchair lift of claim 15 wherein the planetary gear mechanism comprises a ring gear.

20. The wheelchair lift of claim 19 wherein when the clutch plate of the actuator is in frictional contact with the ring gear, the actuator arm exerts force on the barrier.

21. The wheelchair lift of claim 19 wherein the contact surface of the clutch plate of the actuator is biased toward the ring gear.

22. The wheelchair lift of claim 15 wherein the actuator further comprises a wave washer configured to bias the clutch plate toward the planetary gear mechanism.

23. A method of actuating a barrier of a wheelchair lift, the method comprising the steps of:
providing an actuator having a motor, a planetary gear mechanism, and a clutch plate, the clutch plate having an actuator arm connected to the barrier;
biasing the clutch plate toward the planetary gear mechanism such that it is in frictional contact with the planetary gear mechanism; and
driving the motor to operate the planetary gear mechanism which in turn drives the clutch plate.

24. The method of claim 23 wherein the planetary gear mechanism comprises a plurality of planetary gears and a ring gear, wherein the plurality of planetary gears engage the ring gear, and wherein the ring gear drives the clutch plate.

25. An actuator comprising:
a motor;
a planetary gear mechanism in operative communication with the motor; and
a clutch plate, having a contact surface in frictional contact with the planetary gear mechanism;
wherein the contact surface of the clutch plate is biased toward the planetary gear mechanism.

26. An actuator comprising:
a motor;
a planetary gear mechanism in operative communication with the motor; and
a clutch plate, having a contact surface in frictional contact with the planetary gear mechanism;
wherein the planetary gear mechanism comprises a ring gear and the contact surface of the clutch plate is biased toward the ring gear of the planetary gear mechanism.

27. An actuator comprising:
a motor;
a planetary gear mechanism in operative communication with the motor;
a clutch plate, having a contact surface in frictional contact with the planetary gear mechanism; and
a wave washer configured to bias the clutch plate toward the planetary gear mechanism.

28. A wheelchair lift, comprising:
a barrier; and
an actuator configured to automatically actuate the barrier wherein the actuator comprises (i) a motor, (ii) a planetary gear mechanism having a ring gear, wherein the planetary gear mechanism is in operative communication with the motor, and (iii) a clutch plate having a contact surface in frictional contact with the planetary gear mechanism, wherein the contact surface of the clutch plate is biased toward the ring gear.

29. A wheelchair lift comprising:

a barrier; and an actuator configured to automatically actuate the barrier wherein the actuator comprises a motor, a planetary gear mechanism in operative communication with the motor, a clutch plate having a contact surface in frictional contact with the planetary gear mechanism, and a wave washer configured to bias the clutch plate toward the planetary gear mechanism.

30. An actuator comprising:

a motor;

a planetary gear mechanism in operative communication with the motor;

a clutch plate, connected to an actuator arm and having a contact surface in frictional contact with the planetary gear mechanism, wherein the actuator arm has a range of travel; and a means for limiting the range of travel of the actuator arm.

* * * * *